United States Patent
Oyobe et al.

(10) Patent No.: US 7,819,213 B2
(45) Date of Patent: Oct. 26, 2010

(54) POWER OUTPUT APPARATUS AND VEHICLE HAVING THE SAME

(75) Inventors: Hichirosai Oyobe, Toyota (JP); Tetsuhiro Ishikawa, Nishikamo-gun (JP); Yukihiro Minezawa, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 729 days.

(21) Appl. No.: 11/663,190

(22) PCT Filed: Sep. 26, 2005

(86) PCT No.: PCT/JP2005/018229
§ 371 (c)(1),
(2), (4) Date: Mar. 19, 2007

(87) PCT Pub. No.: WO2006/035959
PCT Pub. Date: Apr. 6, 2006

(65) Prior Publication Data
US 2008/0073135 A1    Mar. 27, 2008

(30) Foreign Application Priority Data
Sep. 29, 2004   (JP)  ............................. 2004-284439

(51) Int. Cl.
*B60K 6/26* (2007.10)

(52) U.S. Cl. .............................. 180/65.27; 180/65.285; 903/906

(58) Field of Classification Search .............. 180/65.27, 180/65.285, 65.29; 903/906; 318/803; 324/509, 324/521, 522
See application file for complete search history.

(56) References Cited

U.S. PATENT DOCUMENTS

| | | | |
|---|---|---|---|
| 3,996,513 A * | 12/1976 | Butler ........................ | 324/509 |
| 5,099,186 A | 3/1992 | Rippel et al. | |
| 5,481,194 A * | 1/1996 | Schantz et al. .............. | 324/522 |
| 6,388,451 B1 | 5/2002 | Burba et al. | |
| 6,456,085 B1 * | 9/2002 | Dietl et al. .................. | 324/509 |
| 2002/0070715 A1 | 6/2002 | Sasaki et al. | |
| 2003/0146726 A1 | 8/2003 | Ishikawa et al. | |
| 2004/0162696 A1 | 8/2004 | Kumar | |

FOREIGN PATENT DOCUMENTS

| | | |
|---|---|---|
| EP | 0 493 848 A2 | 7/1992 |
| EP | 0 780 960 A1 | 6/1997 |
| EP | 1 168 593 A2 | 1/2002 |
| JP | 04-295202 A | 10/1992 |
| JP | 07-059257 A | 3/1995 |
| JP | 07-288924 A | 10/1995 |
| JP | 08-126121 | 5/1996 |
| JP | 10-290529 A | 10/1998 |
| JP | 11-205909 A | 7/1999 |
| JP | 2000-032772 A | 1/2000 |
| JP | 2000-354332 | 12/2000 |
| JP | 2003-235105 A | 8/2003 |
| KR | 1020020077151 A | 10/2002 |
| WO | WO 2006/121142 A1 | 11/2006 |

* cited by examiner

*Primary Examiner*—Frank B Vanaman
(74) *Attorney, Agent, or Firm*—Kenyon & Kenyon LLP

(57) ABSTRACT

A power output apparatus generates a commercial AC voltage across neutral points of first and second motor generators. The power output apparatus includes a leakage detecting device, and upon detection of leakage by the leakage detecting device, causes an AC output cutoff circuit to operate and also shuts down one or both of the first and second motor generators according to the operational states at the time. Further, the leakage detecting device performs checking of the leakage detecting function in response to a test signal from a control device, before outputting the commercial AC voltage.

16 Claims, 5 Drawing Sheets

|  | DURING REGENERATIVE OPERATION OF MOTOR GENERATOR MG1 | NOT DURING REGENERATIVE OPERATION OF MOTOR GENERATOR MG1 |
|---|---|---|
| WHEN RUNNING | STOP INVERTER 20 ALONE | |
| WHEN STOPPED | STOP INVERTER 30 ALONE | STOP BOTH INVERTERS 20 AND 30 |

POWER OUTPUT APPARATUS AND VEHICLE HAVING THE SAME

This is a 371 national phase application of PCT/JP 2005/018229 filed 26 Sep. 2005, which claims priority of Japanese Patent Application No. 2004-284439 filed 29 Sep. 2004, the contents of which are incorporated herein by reference.

TECHNICAL FIELD

The present invention relates to a power output apparatus and a vehicle provided with the same, and more particularly to a power output apparatus capable of generating a commercial alternating-current (AC) voltage and outputting the same to an external AC load, and a vehicle provided with such a power output apparatus.

BACKGROUND ART

Japanese Patent Laying-Open No. 10-290529 discloses an electric power unit mounted to an electric vehicle. The electric power unit includes a battery, an electric circuit system such as a running motor supplied with power from the battery and an on-vehicle auxiliary machine, an inverter circuit for generating a commercial AC voltage that converts a direct-current (DC) voltage from the battery to a commercial AC voltage for application to an external AC load, a cutoff switch provided between the inverter circuit and the external AC load, and a leakage detecting circuit that detects a ground-fault current leaking from the battery so as to detect leakage of the electric circuit system. Upon detection of the leakage, the leakage detecting circuit stops the inverter circuit and causes the cutoff switch to operate to firstly cut off the power supply to the external AC load, without interrupting the power supply to the electric circuit system such as the running motor and the on-vehicle auxiliary machine.

According to this electric power unit, when there occurs leakage in the external AC load, the power supply circuit system for the external AC load is first interrupted preferentially. Thus, occurrence of critical problems such as electric shock, deterioration of the original function of the electric vehicle and the like can be prevented quickly, without impairing the power supply to the electric circuit system in the main body of the electric vehicle including the running motor and the on-vehicle auxiliary machine.

In, the electric power unit disclosed in Japanese Patent Laying-Open No. 10-290529, the power supply circuit system for the external AC load is configured with a separate system from the electric circuit system including the running motor and the on-vehicle auxiliary machine (hereinafter, also referred to as a "main circuit system" for clear distinction from the power supply circuit system for the external AC load). That is, the electric power unit disclosed in Japanese Patent Laying-Open No. 10-290529 includes the inverter circuit for generating a commercial AC voltage separately from the inverter for driving the running motor, the on-vehicle auxiliary machine and the like. Upon detection of the leakage, only the power supply circuit system for the external AC load is shut down.

In the case where a system is to be configured to use the main circuit system for supplying power to an external AC load, instead of providing an additional inverter circuit for generating the commercial AC voltage, for the purposes of downsizing the device and reducing the cost, however, simply shutting down the inverter of the main circuit system to cut off the power supply to the external AC load upon detection of the leakage may adversely affect the operations of the running motor and/or the on-vehicle auxiliary machine in a certain operational state.

Here, although it may be conceivable to operate only the cutoff switch to stop the power supply to the external AC load, without stopping the inverter, it cannot reliably stop the output in two steps or two ways, which leads to lack of safety.

Further, in order to ensure sufficient safety with regard to the leakage, checking of operations of the leakage detecting function is required before starting the power supply to the external AC load.

DISCLOSURE OF THE INVENTION

The present invention has been made to solve the above-described problems, and an object of the present invention is to provide a power output apparatus that sufficiently ensures safety upon occurrence of leakage.

Another object of the present invention is to provide a power output apparatus that sufficiently ensures safety upon occurrence of leakage while taking into consideration an influence on a main circuit system.

A further object of the present invention is to provide a vehicle mounted with a power output apparatus that sufficiently ensures safety upon occurrence of leakage.

Yet another object of the present invention is to provide a vehicle mounted with a power output apparatus that sufficiently ensures safety upon occurrence of leakage while taking into consideration an influence on a main circuit system.

According to the present invention, a power output apparatus includes: first and second motor generators; first and second inverters connected to the first and second motor generators, respectively; a control device controlling operations of the first and second inverters to drive the first and second motor generators and to generate an AC voltage across neutral points of the first and second motor generators; an AC output cutoff circuit provided between an output line pair connected to the neutral points of the first and second motor generators and an output terminal for outputting the AC voltage to an external AC load; and a leakage detecting device for detecting presence/absence of leakage, and generating a cutoff command upon detection of the leakage to cause the AC output cutoff circuit to cut off output of the AC voltage and to stop an operation of at least one of the first and second inverters.

Preferably, the leakage detecting device outputs the cutoff command to the AC output cutoff circuit and to the control device, and the control device, upon receipt of the cutoff command from the leakage detecting device, stops one of the first and second inverters according to operational states of the first and second motor generators.

Preferably, the first motor generator is coupled to an internal combustion engine of a vehicle, the second motor generator is coupled to driving wheels of the vehicle, and the operational states include a first state where the second motor generator is driving the driving wheels, and a second state where the second motor generator is not driving the driving wheels and the first motor generator is in a regenerative operation.

Preferably, the control device stops the first inverter when receiving the cutoff command from the leakage detecting device during the first state.

Preferably, the control device stops the second inverter when receiving the cutoff command from the leakage detecting device during the second state.

Preferably, the first motor generator is coupled to an internal combustion engine of a vehicle, the second motor generator is coupled to driving wheels of the vehicle, the leakage detecting device outputs the cutoff command to the AC output cutoff circuit and to the control device, and the control device stops the first and second inverters when receiving the cutoff command from the leakage detecting device during the time when the second motor generator is not driving the driving wheels and the first motor generator is not in a regenerative operation.

Preferably, the leakage detecting device performs functional checking as to whether presence/absence of leakage can be detected normally or not, before starting output of the AC voltage to the external AC load.

Preferably, the leakage detecting device includes a testing power supply line on which a current is flown at the time of the functional checking, a flux-collecting core through which the output line pair and the testing power supply line extend, a coil wound around the flux-collecting core, and a signal generating unit for generating the cutoff command when a voltage difference between ends of the coil exceeds a prescribed value.

Preferably, the AC voltage is a commercial AC voltage.

Further, according to the present invention, a vehicle includes any of the power output apparatuses described above, and the power output apparatus supplies the AC voltage to the external AC load connected to the output terminal.

In the power output apparatus according to the present invention, an AC voltage that can be output to an external AC load is generated across the neutral points of the first and second motor generators. Upon detection of leakage by the leakage detecting device, output of the AC voltage is stopped by the AC output cutoff circuit, and operation of at least one of the first and second inverters is also stopped to stop generation of the AC voltage, based on a cutoff command from the leakage detecting device.

Therefore, according to the present invention, output of the AC voltage is stopped doubly or in two ways, which sufficiently ensures safety upon occurrence of leakage. Further, according to the present invention, the AC voltage can be supplied to an external AC load without provision of an inverter dedicated to generating the AC voltage.

Further, in the power output apparatus according to the present invention, the leakage detecting device outputs the cutoff command to the AC output cutoff circuit and to the control device. When the control device receives the cutoff command from the leakage detecting device, it stops one of the first and second inverters according to the operational states of the first and second motor generators, so as to stop generation of the AC voltage.

Therefore, according to the present invention, it is possible to suppress the influence on the main circuit system, while sufficiently ensuring safety upon occurrence of leakage, since the operational states of the first and second motor generators are taken into consideration.

Still further, in the power output apparatus according to the present invention, the leakage detecting device outputs the cutoff command to the AC output cutoff circuit and to the control device. When the control device receives the cutoff command from the leakage detecting device in the state where the second motor generator is not driving the driving wheels and the first motor generator is not in the regenerative operation, it stops both the first and second inverters to stop generation of the AC voltage.

Therefore, according to the present invention, it is possible to secure higher safety upon occurrence of leakage, taking into consideration the operational states of the first and second motor generators.

Still further, in the power output apparatus according to the present invention, the leakage detecting device performs checking of the leakage detecting function before starting output of the AC voltage to the external AC load. That is, it is checked in advance as to whether the leakage detecting device can operate normally or not upon occurrence of leakage.

Therefore, according to the present invention, the safety upon occurrence of leakage can further be increased.

In the vehicle according to the present invention, the above-described power output apparatus is provided. Thus, according to the present invention, safety at the time of occurrence of leakage can be ensured sufficiently. Further, while the safety upon occurrence of leakage being ensured sufficiently, the influence on the operations of the vehicle can also be restricted. Still further, since the vehicle does not include an inverter dedicated to generating an AC voltage, reduction in size and weight as well as in cost can be realized while the additional function as the AC power supply is provided.

BEST MODES FOR CARRYING OUT THE INVENTION

Figure 1:
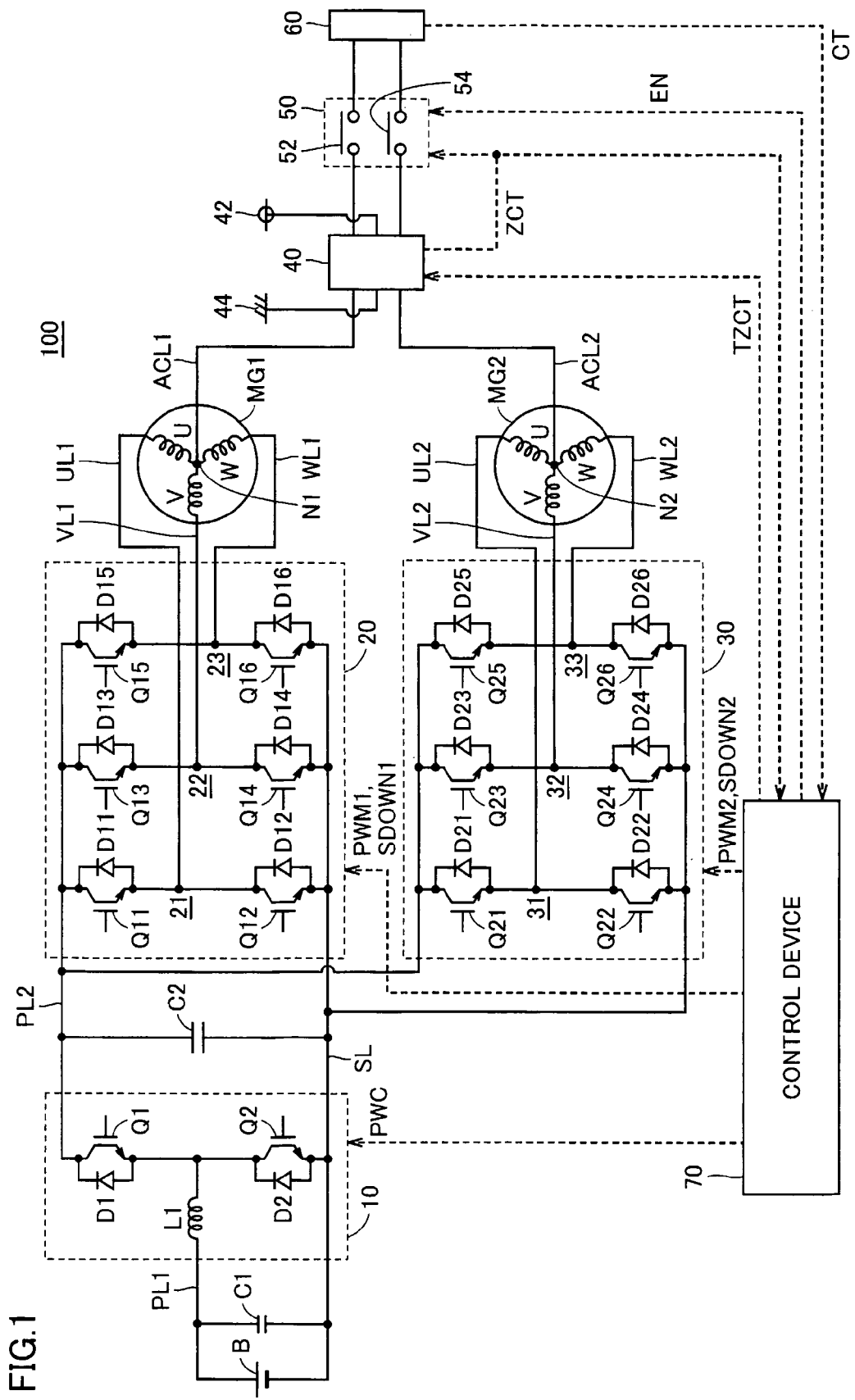
FIG. 1 is a schematic block diagram of a power output apparatus according to an embodiment of the present invention.

Hereinafter, an embodiment of the present invention will be described in detail with reference to the drawings. In the drawings, the same or corresponding portions have the same reference characters allotted, and description thereof will not be repeated.

FIG. 1 is a schematic block diagram of a power output apparatus according to an embodiment of the present invention. Referring to FIG. 1, the power output apparatus 100 includes a battery B, an up-converter 10, inverters 20 and 30, motor generators MG1 and MG2, a leakage detecting device 40, an AC output cutoff circuit 50, a connector 60, a control device 70, capacitors C1 and C2, power supply lines PL1 and PL2, a ground line SL, U-phase lines UL1 and UL2, V-phase lines VL1 and VL2, W-phase lines WL1 and WL2, and AC output lines ACL1 and ACL2.

Power output apparatus 100 is incorporated into a hybrid vehicle, for example. Motor generator MG1 is incorporated into the hybrid vehicle as one that operates as an electric generator driven by an engine and also operates as an electric motor that can start the engine. Motor generator MG2 is incorporated into the hybrid vehicle as one that operates as an electric motor driving the driving wheels of the hybrid vehicle.

Each of motor generators MG1 and MG2 is formed of a three-phase AC synchronous motor generator, for example. Motor generator MG1 uses the rotational force of the engine to generate an AC voltage, and outputs the generated AC voltage to inverter 20. Motor generator MG1 also generates driving force by the AC voltage received from inverter 20, to start the engine. Motor generator MG2 generates driving torque of the vehicle by the AC voltage received from inverter 30. At the time of regenerative braking of the vehicle, motor generator MG2 generates and outputs an AC voltage to inverter 30.

Battery B, which is a DC power supply, is formed, e.g., of a nickel-hydrogen or lithium-ion secondary battery. Battery B outputs the generated DC voltage to up-converter 10, and is charged by the DC voltage output from up-converter 10.

Up-converter 10 includes a reactor L1, npn transistors Q1 and Q2, and diodes D1 and D2. Reactor L1 has one end connected to power supply line PL1 and the other end connected to a connection node of npn transistors Q1 and Q2. Npn transistors Q1, Q2 are connected in series between power supply line PL2 and ground line SL, and each have a base receiving a control signal PWC from control device 70. Diodes D1, D2 are connected across the collector and emitter of npn transistors Q1, Q2, respectively, so as to cause a current to flow from the emitter side to the collector side.

Inverter 20 includes a U-phase arm 21, a V-phase arm 22 and a W-phase arm 23. U-phase arm 21, V-phase arm 22 and W-phase arm 23 are connected in parallel between power supply line PL2 and ground line SL. U-phase arm 21 is formed of npn transistors Q11, Q12 connected in series, V-phase arm 22 is formed of npn transistors Q13, Q14 connected in series, and W-phase arm 23 is formed of npn transistors Q15, Q16 connected in series. Diodes D11-D16 are connected across the collector and emitter of npn transistors Q11-Q16, respectively, to cause a current to flow from the emitter side to the collector side.

The connection nodes of the npn transistors in the respective phase arms are connected to ends of the corresponding phase coils of motor generator MG1 on the opposite side from its neutral point, via U-, V- and W-phase lines UL1, VL1 and WL1, respectively.

Inverter 30 includes a U-phase arm 31, a V-phase arm 32 and a W-phase arm 33. U-phase arm 31, V-phase arm 32 and W-phase arm 33 are connected in parallel between power supply line PL2 and ground line SL. U-phase arm 31 is formed of npn transistors Q21, Q22 connected in series, V-phase arm 32 is formed of npn transistors Q23, Q24 connected in series, and W-phase arm 33 is formed of npn transistors Q25, Q26 connected in series. Diodes D21-D26 are connected across the collector and emitter of npn transistors Q21-Q26, respectively, to cause a current to flow from the emitter side to the collector side.

In inverter 30 as well, the connection nodes of the npn transistors in the respective phase arms are connected to ends of the corresponding phase coils of motor generator MG2 on the opposite side from its neutral point, via U-, V- and W-phase lines UL2, VL2 and WL2, respectively.

Capacitor C1 is connected between power supply line PL1 and ground line SL, to reduce the effect caused by voltage variation on battery B and up-converter 10. Capacitor C2 is connected between power supply line PL2 and ground line SL, to reduce the effect caused by voltage variation on inverters 20, 30 and up-converter 10.

Up-converter 10, based on a control signal PWC from control device 70, stores the flowing current according to the switching operation of npn transistor Q2 as magnetic field energy at reactor L1, to boost the DC voltage from battery B. It then outputs the boosted voltage via diode D1 to power supply line PL2 in synchronization with the timing at which npn transistor Q2 is turned off. Further, up-converter 10, based on control signal PWC from control device 70, down-converts the DC voltage received from inverter 20 and/or inverter 30 via power supply line PL2 to a voltage level of battery B, to thereby charge battery B.

Inverter 20, based on a control signal PWM1 from control device 70, converts the DC voltage supplied from power supply line PL2 to an AC voltage and outputs the same to motor generator MG1. As such, motor generator MG1 is driven to generate desired torque. Further, inverter 20 converts the AC voltage generated by motor generator MG1 to a DC voltage based on control signal PWM1 from control device 70, and outputs the DC voltage to power supply line PL2.

Here, inverter 20 drives motor generator MG1 while controlling the potential at its neutral point N1 based on control signal PWM1 from control device 70, such that a commercial AC voltage Vac is generated across the neutral point N1 of motor generator MG1 and a neutral point N2 of motor generator MG2.

Further, inverter 20 stops its operation when it receives a shutdown command SDOWN1 from control device 70.

Inverter 30, based on a control signal PWM2 from control device 70, converts the DC voltage supplied from power supply line PL2 to an AC voltage, and outputs the same to motor generator MG2. As such, motor generator MG2 is driven to generate desired torque. In the regenerative braking operation of motor generator MG2, inverter 30 converts the AC voltage output from motor generator MG2 to a DC voltage based on control signal PWM2 from control device 70, and outputs the DC voltage to power supply line PL2.

Here, inverter 30 drives motor generator MG2 while controlling the potential at its neutral point N2 based on control signal PWM2 from control device 70, such that commercial AC voltage Vac is generated across neutral points N1 and N2.

Upon receipt of a shutdown command SDOWN2 from control device 70, inverter 30 stops its operation.

Leakage detecting device 40 is provided on AC output lines ACL1, ACL2. AC output lines ACL1, ACL2 constitute a power supply line pair for extracting commercial AC voltage Vac generated across neutral points N1, N2 of motor generators MG1, MG2. AC output line ACL1 connects neutral point N1 to AC output cutoff circuit 50, and AC output line ACL2 connects neutral point N2 to AC output cutoff circuit 50. Leakage detecting device 40, upon detection of leakage, outputs a cutoff command ZCT to AC output cutoff circuit 50 and control device 70. Leakage detecting device 40 causes a current to flow from a power supply node 42 to a ground node 44 in response to a test signal TZCT from control device 70, so as to check operations of the leakage detecting function.

AC output cutoff circuit 50 includes relays 52 and 54. Relay 52 is connected between AC output line ACL1 and connector 60, and relay 54 is connected between AC output line ACL2 and connector 60. Upon receipt of an output enable command EN from control device 70, AC output cutoff circuit 50 turns on relays 52 and 54, to electrically connect connector 60 to AC output lines ACL1 and ACL2. Upon receipt of cutoff command ZCT from leakage detecting device 40, AC output cutoff circuit 50 turns off relays 52 and 54, to electrically disconnect connector 60 from AC output lines ACL1 and ACL2.

Connector 60 is an output terminal for outputting commercial AC voltage Vac generated across neutral point N1 of motor generator MG1 and neutral point N2 of motor generator MG2 to an external AC load. A power supply plug for an electric appliance or for household backup power is connected to connector 60. When the external AC load is connected, connector 60 outputs a signal CT of an H level to control device 70.

Control device 70 generates control signal PWC for driving up-converter 10 based on a torque command value and the number of rotations of each of motor generators MG1, MG2, a voltage of battery B, and a voltage on power supply line PL2, and outputs the generated control signal PWC to up-converter 10. The number of rotations of each of motor generators MG1, MG2, the voltage of battery B and the voltage of power supply line PL2 are detected by corresponding sensors (not shown).

Control device 70 generates control signal PWM1 for driving motor generator MG1 based on the voltage on power supply line PL2 and phase currents and the torque command value of motor generator MG1. Here, control device 70 generates control signal PWM1 while controlling duty summation of npn transistors Q11, Q13, Q15 of the upper arm and npn transistors Q12, Q14, Q16 of the lower arm, such that commercial AC voltage Vac is generated across neutral point N1 of motor generator MG1 and neutral point N2 of motor generator MG2. Control device 70 then outputs the generated control signal PWM1 to inverter 20.

Further, control device 70 generates control signal PWM2 for driving motor generator MG2 based on the voltage on power supply line PL2 and phase currents and the torque command value of motor generator MG2. Here, control device 70 generates control signal PWM2 while controlling duty summation of npn transistors Q21, Q23, Q25 of the upper arm and npn transistors Q22, Q24, Q26 of the lower arm, such that commercial AC voltage Vac is generated across neutral points N1 and N2. Control device 70 then outputs the generated control signal PWM2 to inverter 30. A current sensor (not shown) detects each phase current in motor generators MG1, MG2.

When a prescribed start switch SW is turned on in the state where an external AC load is connected to connector 60, control device 70 outputs to leakage detecting device 40 a test signal TZCT for conducting functional checking as to whether the leakage detecting function of leakage detecting device 40 works normally. When determining that the leakage detecting function is normal, control device 70 outputs an output enable command EN to AC output cutoff circuit 50. This allows commercial AC voltage Vac generated across neutral points N1 and N2 to be output from connector 60 to the external AC load.

Upon receipt of cutoff command ZCT from leakage detecting device 40, control device 70 determines which inverter should be stopped operating, according to the operational states of motor generators MG1, MG2 at the time. Control device 70, based on the result of determination, outputs a corresponding shutdown command SDOWN1 or SDOWN2 to the inverter of which operation should be stopped.

Figure 2:
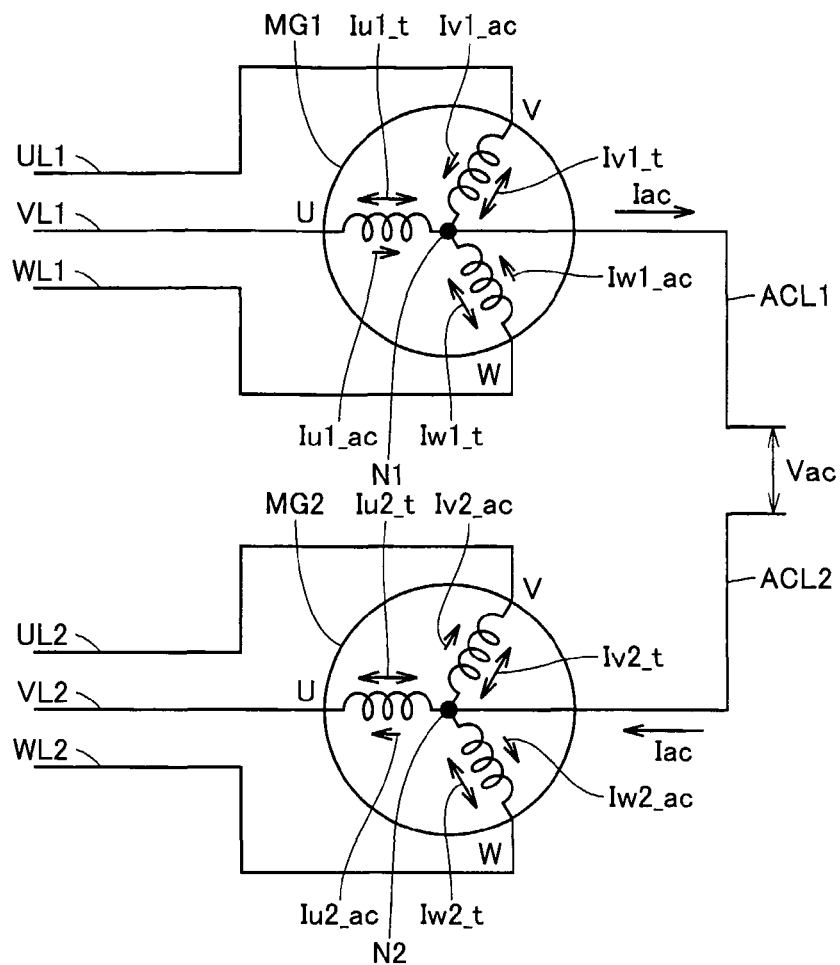
FIG. 2 illustrates currents flowing across motor generators shown in FIG. 1.

FIG. 2 illustrates currents flowing across motor generators MG1, MG2 shown in FIG. 1. In FIG. 2, the case where an alternating current Iac flows from neutral point N1 of motor generator MG1 to neutral point N2 of motor generator MG2 is shown representatively.

Referring to FIG. 2, inverter 20 (not shown) connected to U-, V- and W-phase lines UL1, VL1 and WL1 carries out a switching operation based on control signal PWM1 from control device 70 (not shown hereinafter), to cause a U-phase current formed of current components Iu1_t, Iu1_ac to flow to the U-phase coil of motor generator MG1, a V-phase current formed of current components Iv1_t, Iv1_ac to flow to the V-phase coil of motor generator MG1, and a W-phase current formed of current components Iw1_t, Iw1_ac to flow to the W-phase coil of motor generator MG1.

Inverter 30 (not shown) connected to U-, V- and W-phase lines UL2, VL2 and WL2 carries out a switching operation based on control signal PWM2 from control device 70, to cause a U-phase current formed of current components Iu2_t, Iu2_ac to flow to the U-phase coil of motor generator MG2, a V-phase current formed of current components Iv2_t, Iv2_ac to flow to the V-phase coil of motor generator MG2, and a W-phase current formed of current components Iw2_t, Iw2_ac to flow to the W-phase coil of motor generator MG2.

Here, current components Iu1_t, Iv1_t, Iw1_t are for generating torque at motor generator MG1, and current components Iu2_t, Iv2_t, Iw2_t are for generating torque at motor generator MG2. Current components Iu1_ac, Iv1_ac, Iw1_ac are for causing an alternating current Iac to flow from neutral point N1 of motor generator MG1 to AC output line ACL1, and current components Iu2_ac, Iv2_ac, Iw2_ac are for causing alternating current Iac to flow from AC output line ACL2 to neutral point N2 of motor generator MG2. Current components Iu1_ac, Iv1_ac, Iw1_ac, Iu2_ac, Iv2_ac, Iw2_ac are equal to each other, and do not contribute to the torque of motor generators MG1, MG2. The total value of current components Iu1_ac, Iv1_ac, Iw1_ac and the total value of current components Iu2_ac, Iv2_ac, Iw2_ac each correspond to alternating current Iac.

As such, inverters 20, 30 generate commercial AC voltage Vac across neutral point N1 of motor generator MG1 and neutral point N2 of motor generator MG2, while generating torque at motor generators MG1, MG2.

When motor generator MG1 and/or motor generator MG2 is being stopped, the current components for generating torque at the motor generator(s) being stopped can be set to zero, and only the current components for generating alternating current Iac can be flown to the respective phase coils.

Figure 3:
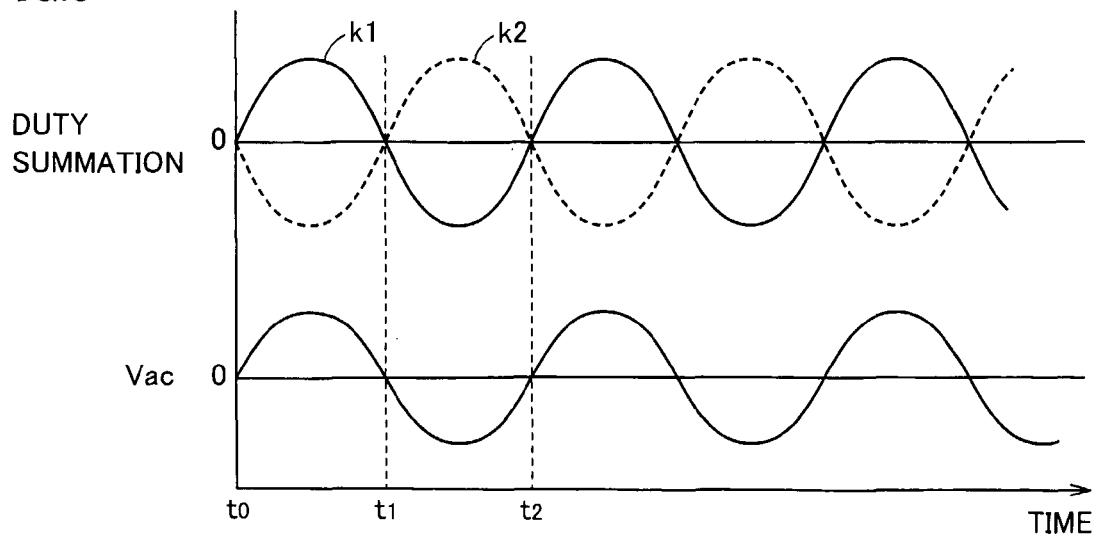
FIG. 3 shows waveforms of duty summation and a commercial AC voltage.

FIG. 3 shows waveforms of duty summation and commercial AC voltage Vac. Referring to FIG. 3, a curve k1 represents the change in duty summation during switching control of inverter 20, and a curve k2 represents the change in duty summation during switching control of inverter 30. Here, the duty summation refers to a result of subtraction of on-duty of the lower arm from on-duty of the upper arm in each inverter. In FIG. 3, when the duty summation takes a positive value, it indicates that a potential at the neutral point of the corresponding motor generator is higher than an intermediate value (Vdc/2) of the inverter input voltage Vdc (the voltage of power supply line PL2 shown in FIG. 1). When the duty summation takes a negative value, it indicates that the potential at the neutral point is lower than potential Vdc/2.

In power output apparatus 100, control device 70 periodically alters the duty summation of inverter 20 at a commercial frequency (50 Hz or 60 Hz) according to curve k1, and periodically alters the duty summation of inverter 30 at the commercial frequency according to curve k2. Here, the duty summation of inverter 30 is altered periodically in a phase that is an inverted version of the phase in which the duty summation of inverter 20 is altered.

As a result, during the time period from t0 to t1, the potential at neutral point N1 becomes higher than potential Vdc/2, and the potential at neutral point N2 becomes lower than potential Vdc/2, so that a positive commercial AC voltage Vac is generated across neutral points N1 and N2. Here, when an external AC load is connected to connector 60, the excess current that could not flow from the upper arm to the lower arm in inverter 20 flows from neutral point N1 via AC output line ACL1, the external AC load and AC output line ACL2 to neutral point N2, and then it flows from neutral point N2 to the lower arm of inverter 30.

During the time period from t1 to t2, the potential at neutral point N1 is lower than potential Vdc/2 and the potential at neutral point N2 is higher than potential Vdc/2. Thus, a negative commercial AC voltage Vac is generated across neutral points N1 and N2. The excess current that could not flow from the upper arm to the lower arm in inverter 30 flows from neutral point N2 via AC output line ACL2, the external AC load and AC output line ACL1 to neutral point N1, and then it flows from neutral point N1 to the lower arm of inverter 20.

In this manner, in power output apparatus 100, a commercial AC voltage Vac can be generated across neutral points N1 and N2.

While motor generator MG1 and/or motor generator MG2 is being stopped, the inverter(s) corresponding to the motor generator(s) being stopped can be subjected to switching control such that the current components for generating torque in the motor generator(s) being stopped are set to zero and that only the current components for generating alternating current Iac are generated on the phase coils. For example, in the inverter corresponding to the motor generator being stopped, switching control of the respective phase arms can be done at the same timing.

Figures 4, 5:
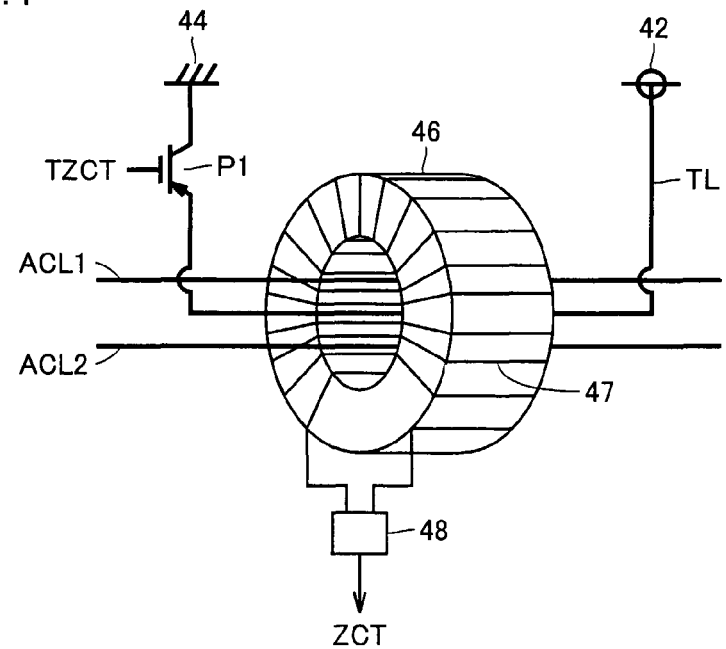
FIG. 4 shows a configuration of a leakage detecting device shown in FIG. 1.
FIG. 5 illustrates motor generators to be stopped when leakage is detected.

FIG. 4 shows a configuration of leakage detecting device 40 shown in FIG. 1. Referring to FIG. 4, leakage detecting device 40 includes a flux-collecting core 46, a coil 47, a signal generating unit 48, a testing power supply line TL, and a pnp transistor P1. Flux-collecting core 46 is formed of a material of high magnetic permeability, such as a permalloy material, and collects magnetic flux generated in its vicinity in accordance with the current flowing through AC output lines ACL1, ACL2 or testing power supply line TL. Coil 47 is wound around flux-collecting core 46, and generates a voltage difference between its ends upon occurrence of magnetic flux in flux-collecting core 46. Signal generating unit 48 is connected to the ends of coil 47, and outputs a cutoff command ZCT when the voltage difference generated at the ends of coil 47 exceeds a prescribed value.

Testing power supply line TL is for checking operations of the leakage detection function of leakage detecting device 40. Testing power supply line TL is arranged to extend through the inner peripheral side of flux-collecting core 46 along with AC output lines ACL1, ACL2. Testing power supply line TL has one end connected to power supply node 42 and the other end connected to pnp transistor P1. Pnp transistor P1 is provided between testing power supply line TL and ground node 44, and has a base receiving a test signal TZCT from control device 70 (not shown).

In a normal operation other than the test operation, leakage detecting device 40 receives test signal TZCT of an H level from control device 70. That is, in the normal operation, pnp transistor P1 is off, and there is no current flowing through testing power supply line TL.

In the normal operation, alternating currents Iac flow through AC output lines ACL1, ACL2 in the opposite directions. If there is no leakage and the currents flowing through AC output lines ACL1 and ACL2 are equal to each other, the magnetic flux generated by the current flowing through AC output line ACL1 and the magnetic flux generated by the current flowing through AC output line ACL2 cancel out each other, so that the magnetic flux generated at flux-collecting core 46 becomes zero. In this case, there occurs no voltage difference at the ends of coil 47, and accordingly, signal generating unit 48 does not output cutoff command ZCT.

In contrast, when there is a leakage, the balance between the magnetic flux generated by the current flowing through AC output line ACL1 and the magnetic flux generated by the current flowing through AC output line ACL2 is lost, and there occurs magnetic flux at flux-collecting core 46. This causes a voltage difference at the ends of coil 47 according to the magnetic flux generated. When the voltage difference exceeds a prescribed value, signal generating unit 48 determines that the leakage has occurred and outputs cutoff command ZCT.

In a test operation, leakage detecting device 40 receives test signal TZCT of an L level from control device 70. In response, pnp transistor P1 turns on, and a current flows through testing power supply line TL from power supply node 42 to ground node 44. Accordingly, there occurs magnetic flux at flux-collecting core 46, and signal generating unit 48 outputs cutoff command ZCT.

As described above, in power output apparatus 100, it is possible to check the function of leakage detecting device 40 without actually causing currents to flow through AC output lines ACL1, ACL2, by outputting test signal TZCT from control device 70 to leakage detecting device 40 and by checking presence/absence of a cutoff command output from leakage detecting device 40.

In power output apparatus 100, as shown in FIG. 1, leakage detecting device 40 outputs cutoff command ZCT to AC output cutoff circuit 50 as well as to control device 70. When leakage is detected by leakage detecting device 40, AC output cutoff circuit 50 is made to operate, and in addition, one or both of inverters 20, 30 are shut down in response to the operational states of motor generators MG1, MG2. This ensures that the system for outputting an AC voltage to connector 60 is cut off doubly or in two ways upon detection of leakage, whereby safety is improved.

FIG. 5 illustrates motor generator(s) to be stopped upon detection of leakage. Referring to FIG. 5, when a hybrid vehicle mounted with power output apparatus 100 is running, control device 70 shuts down only inverter 20 corresponding to motor generator MG1 upon receipt of cutoff command ZCT from leakage detecting device 40. As such, current supply from inverter 20 to motor generator MG1 is stopped, and there is no current flowing between neutral point N1 of motor generator MG1 and neutral point N2 of motor generator MG2. In this case, when motor generator MG1 is generating power, the generation of power is stopped. However, motor generator MG2 is not shut down, thus preventing immediate deterioration in running capability of the vehicle.

On the other hand, when control device 70 receives cutoff command ZCT from leakage detecting device 40 while the hybrid vehicle mounted with power output apparatus 100 is being stopped and motor generator MG1 is in a regenerative operation (generating power), it shuts down only inverter 30 corresponding to motor generator MG2. As such, current supply from inverter 30 to motor generator MG2 is stopped, and there is no current flowing between neutral points N1 and N2. Since motor generator MG1 is not shut down, the regenerative operation of motor generator MG1 is continued.

Further, when control device 70 receives cutoff command ZCT from leakage detecting device 40 while the hybrid vehicle mounted with power output apparatus 100 is being stopped and motor generator MG1 is not conducting the regenerative operation, control device 70 shuts down both inverters 20 and 30. That is, since motor generators MG1 and MG2 are both not in operation, inverters 20 and 30 are both shut down to secure higher safety.

In the above explanation, one or both of inverters 20 and 30 are shut down in accordance with the operational state of the vehicle. This assures high safety by realizing cutoff in addition to the cutoff by means of AC output cutoff circuit 50, and also prevents degradation of the original function of the vehicle upon occurrence of the leakage. As for the inverter not being shut down, it is preferable to quickly stop its operation subsequently.

It is noted, in the above explanation, the state where the hybrid vehicle is running corresponds to the "first state", and the state where the hybrid vehicle is stopped and motor generator MG1 is in the regenerative operation corresponds to the "second state".

Figure 6:
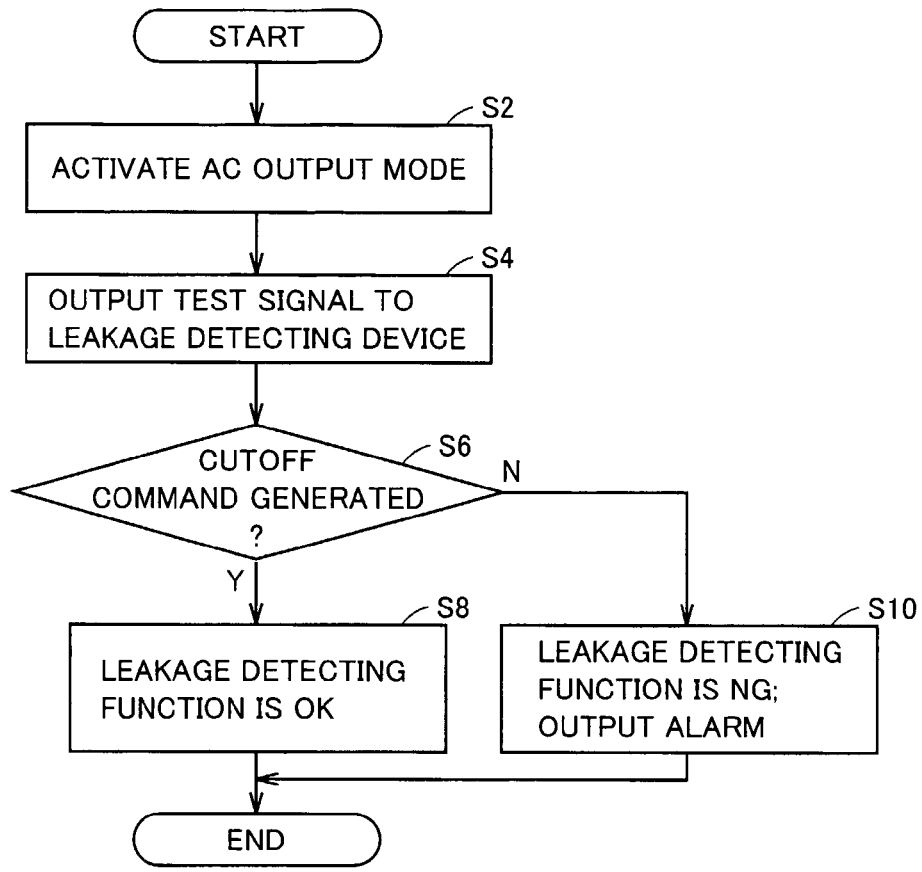
FIG. 6 is a flowchart of an operation test of the leakage detecting device shown in FIG. 1.

FIG. 6 is a flowchart of an operation test of leakage detecting device 40 shown in FIG. 1. Referring to FIG. 6, when a prescribed start switch SW is turned on in the state where an external AC load is connected to connector 60, an AC output mode is activated in which a commercial AC voltage Vac can be output from connector 60 (step S2). In response to activation of the AC output mode, control device 70 outputs test signal TZCT of an L level to leakage detecting device 40 to perform functional checking of leakage detecting device 40 (step S4). Accordingly, in leakage detecting device 40, a current is flown through testing power supply line TL.

When receiving cutoff command ZCT from leakage detecting device 40 (YES in step S6), control device 70 determines that the leakage detecting function of leakage detecting device 40 is normal (step S8). When not receiving cutoff command ZCT from leakage detecting device 40 (NO in step S6), control device 70 determines that the operation of leakage detecting device 40 is abnormal (step S10), and displays on a display device or the like that the leakage detecting function is abnormal.

Figure 7:
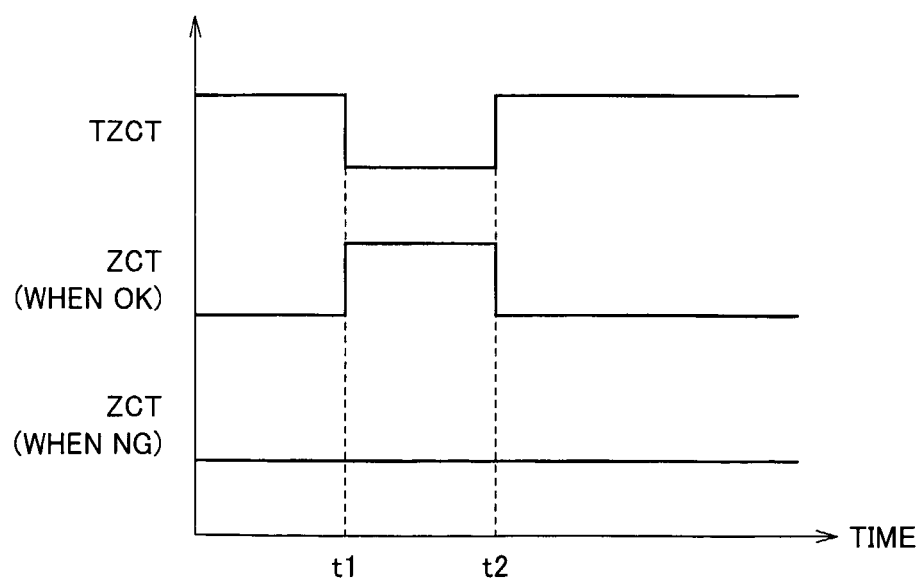
FIG. 7 shows signal waveforms at the time of the operation test of the leakage detecting device shown in FIG. 6.

FIG. 7 shows signal waveforms at the time of the operation test of the leakage detecting device shown in FIG. 6. Referring to FIG. 7, at time t1, control device 70 changes test signal TZCT, being output to leakage detecting device 40, from an H level to an L level. At this time, if leakage detecting device 40 is normal, it will output cutoff command ZCT at an H level to AC output cutoff circuit 50 and to control device 70. If leakage detecting device 40 is abnormal, it will not output cutoff command ZCT.

At time t2, control device 70 changes test signal TZCT from an L level to an H level. If leakage detecting device 40 is normal, it will cause cutoff command ZCT, being output to AC output cutoff circuit 50 and to control device 70, to return to an L level.

It has been explained above that the operation test of leakage detecting device 40 is performed based on cutoff command ZCT that is output from leakage detecting device 40 to AC output cutoff circuit 50 and to control device 70. Alternatively, it may be configured to also check the operations of AC output cutoff circuit 50 as well as the shutdown processes in inverters 20 and 30.

As described above, power output apparatus 100 can generate commercial AC voltage Vac across neutral point N1 of motor generator MG1 and neutral point N2 of motor generator MG2 and output the same from connector 60 to the external AC load. Since inverters 20, 30 driving motor generators MG1, MG2, respectively, are used to generate commercial AC voltage Vac, an inverter dedicated to obtaining commercial AC voltage Vac is unnecessary.

Further, power output apparatus 100 is provided with leakage detecting device 40 and, upon detection of leakage by leakage detecting device 40, it causes AC output cutoff circuit 50 to operate and also shuts down inverter 20 and/or inverter 30. As such, output of commercial AC voltage Vac is interrupted doubly or in two ways, whereby high safety is secured.

Upon detection of leakage by leakage detecting device 40, power output apparatus 100 shuts down one or both of inverters 20, 30 in accordance with the operational states of motor generators MG1, MG2 at that time. Thus, while ensuring safety by double interruption of output as described above, the influence on the original function of power output apparatus 100 can be restricted.

Still further, power output apparatus 100 carries out functional checking of leakage detecting device 40 when an output mode of commercial AC voltage Vac is activated. This assures still higher safety.

Figure 8:
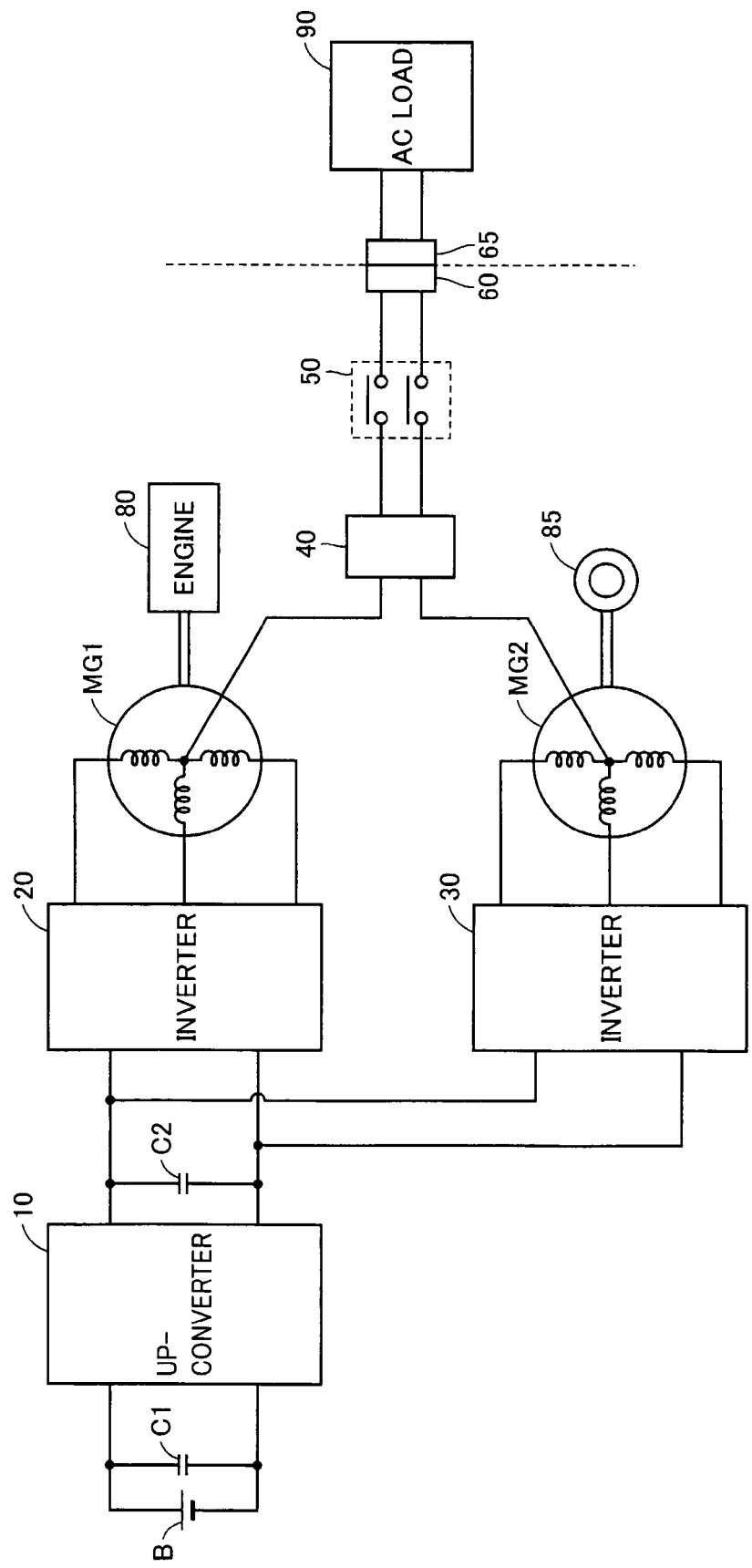
FIG. 8 is a schematic block diagram showing the case where the power output apparatus of the present invention is applied to a hybrid vehicle.

FIG. 8 is a schematic block diagram showing the case where power output apparatus 100 of the present invention is applied to a hybrid vehicle. Referring to FIG. 8, motor generator MG1 is coupled to an engine 80 to start engine 80 as well as to generate electricity by the rotational force of engine 80. Motor generator MG2 is coupled to driving wheels 85 to drive the same, and generates electricity during the regenerative braking of the hybrid vehicle.

A plug 65 of an AC load 90 is connected to connector 60, and power output apparatus 100 supplies an AC voltage of 100V of 50 Hz or 60 Hz to AC load 90 via connector 60 and plug 65. As such, AC load 90 can operate by receiving supply of the commercial AC voltage from power output apparatus 100.

In this manner, in the hybrid vehicle mounted with power output apparatus 100, safety at the time of occurrence of leakage is ensured sufficiently, and the adverse effect of leakage on the vehicle function is suppressed. Further, since the hybrid vehicle is not provided with an inverter dedicated to generating commercial AC voltage Vac, the utility value as a commercial AC power supply can be provided to the vehicle while realizing reduction in size and weight as well as in cost of the vehicle.

Although the case of mounting power output apparatus 100 to a hybrid vehicle has been explained above, the present invention is not restricted thereto. Power output apparatus 100 may be mounted to an electric vehicle or a fuel cell vehicle. Further, the present invention is generally applicable to one using two motor generators. In the case where power output apparatus 100 is incorporated into an electric vehicle or a fuel cell vehicle, motor generators MG1, MG2 are coupled to driving wheels thereof.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power output apparatus, comprising:
    first and second motor generators;
    first and second inverters connected to said first and second motor generators, respectively;
    a control device controlling operations of said first and second inverters to drive said first and second motor generators and to generate an AC voltage across neutral points of said first and second motor generators;
    an AC output cutoff circuit provided between an output line pair connected to the neutral points of said first and second motor generators and an output terminal for outputting said AC voltage to an AC load; and
    a leakage detecting device detecting presence/absence of leakage based on currents flowing through said output line pair in opposite directions from each other by a voltage difference generated between said neutral points when said AC load receives supply of said AC voltage from said neutral points via said output line pair, and generating a cutoff command upon detection of the leakage to cause said AC output cutoff circuit to cut off output of said AC voltage and to stop the operation of at least one of said first and second inverters, wherein:

said leakage detecting device outputs said cutoff command to said AC output cutoff circuit and to said control device, said control device, upon receipt of said cutoff command from said leakage detecting device, stops one of said first and second inverters according to operational states of said first and second motor generators, said first motor generator is coupled to an internal combustion engine of a vehicle, said second motor generator is coupled to driving wheels of said vehicle, and said operational states include
- a first state where said second motor generator is driving said driving wheels, and
- a second state where said second motor generator is not driving said driving wheels and said first motor generator is in a regenerative operation.

2. The power output apparatus according to claim 1, wherein said control device stops said first inverter when receiving said cutoff command from said leakage detecting device during said first state.

3. The power output apparatus according to claim 1, wherein said control device stops said second inverter when receiving said cutoff command from said leakage detecting device during said second state.

4. The power output apparatus according to claim 1, wherein said leakage detecting device performs functional checking as to whether presence/absence of leakage can be detected normally or not, before starting output of said AC voltage to said AC load.

5. The power output apparatus according to claim 4, wherein
said leakage detecting device includes
a testing power supply line on which a current is flowed at the time of said functional checking,
a flux-collecting core through which said output line pair and said testing power supply line extend,
a coil wound around said flux-collecting core, and
a signal generating unit generating said cutoff command when a voltage difference between ends of said coil exceeds a prescribed value.

6. The power output apparatus according to claim 1, wherein said AC voltage is a commercial AC voltage.

7. A vehicle comprising the power output apparatus recited in claim 1, wherein said power output apparatus supplies said AC voltage to said AC load connected to said output terminal.

8. The power output apparatus according to claim 1, wherein said control device controls the operations of said first and second inverters to generate AC voltages of antiphases from each other at the neutral points of said first and second motor generators.

9. The power output apparatus according to claim 1, wherein said leakage detecting device detects the leakage when there occurs an imbalance between the currents flowing through said output line pair in the opposite directions from each other by the voltage difference between said neutral points.

10. A power output apparatus, comprising:
first and second motor generators;
first and second inverters connected to said first and second motor generators, respectively;
a control device controlling operations of said first and second inverters to drive said first and second motor generators and to generate an AC voltage across neutral points of said first and second motor generators;
an AC output cutoff circuit provided between an output line pair connected to the neutral points of said first and second motor generators and an output terminal for outputting said AC voltage to an AC load; and
a leakage detecting device detecting presence/absence of leakage based on currents flowing through said output line pair in opposite directions from each other by a voltage difference generated between said neutral points when said AC load receives supply of said AC voltage from said neutral points via said output line pair, and generating a cutoff command upon detection of the leakage to cause said AC output cutoff circuit to cut off output of said AC voltage and to stop the operation of at least one of said first and second inverters, wherein said first motor generator is coupled to an internal combustion engine of a vehicle, said second motor generator is coupled to driving wheels of said vehicle, said leakage detecting device outputs said cutoff command to said AC output cutoff circuit and to said control device, and said control device stops said first and second inverters when receiving said cutoff command from said leakage detecting device during the time when said second motor generator is not driving said driving wheels and said first motor generator is not in a regenerative operation.

11. The power output apparatus according to claim 10, wherein said leakage detecting device performs functional checking as to whether presence/absence of leakage can be detected normally or not, before starting output of said AC voltage to said AC load.

12. The power output apparatus according to claim 11, wherein
said leakage detecting device includes
a testing power supply line on which a current is flowed at the time of said functional checking,
a flux-collecting core through which said output line pair and said testing power supply line extend,
a coil wound around said flux-collecting core, and
a signal generating unit generating said cutoff command when a voltage difference between ends of said coil exceeds a prescribed value.

13. The power output apparatus according to claim 10, wherein said AC voltage is a commercial AC voltage.

14. A vehicle comprising the power output apparatus recited in claim 10, wherein said power output apparatus supplies said AC voltage to said AC load connected to said output terminal.

15. The power output apparatus according to claim 10, wherein said control device controls the operations of said first and second inverters to generate AC voltages of antiphases from each other at the neutral points of said first and second motor generators.

16. The power output apparatus according to claim 10, wherein said leakage detecting device detects the leakage when there occurs an imbalance between the currents flowing through said output line pair in the opposite directions from each other by the voltage difference between said neutral points.

* * * * *